United States Patent
Ames et al.

(10) Patent No.: US 9,121,715 B2
(45) Date of Patent: Sep. 1, 2015

(54) METHOD FOR DETERMINING VEHICLE LOCATION INCLUDING ROAD SURFACE DATA

(75) Inventors: Michael B. Ames, Lake Orion, MI (US); Curtis L. Hay, Clarkston, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 2290 days.

(21) Appl. No.: 11/106,192

(22) Filed: Apr. 14, 2005

(65) Prior Publication Data

US 2006/0253248 A1    Nov. 9, 2006

(51) Int. Cl.
G01C 21/00 (2006.01)
G01C 21/26 (2006.01)
G01C 21/28 (2006.01)
G01C 21/12 (2006.01)
G01C 21/20 (2006.01)

(52) U.S. Cl.
CPC ............ G01C 21/26 (2013.01); G01C 21/28 (2013.01); *B60G 2400/821* (2013.01); *B60G 2400/824* (2013.01); *G01C 21/12* (2013.01); *G01C 21/20* (2013.01)

(58) Field of Classification Search
CPC ...... G01C 21/005; G01C 21/12; G01C 21/16; G01C 21/165; G01C 21/18; G01C 21/20; G01C 21/26; G01C 21/28; G01S 19/40; G01S 19/42; G01S 19/45; G01S 19/47; G01S 19/49; B60G 2400/821; B60G 2400/824
USPC ........... 701/207, 80, 400, 408, 445, 468, 469, 701/472, 494, 498, 500–502, 505–510, 73, 701/79, 208–217, 5.518; 280/5.517, 5.518
See application file for complete search history.

(56) References Cited

U.S. PATENT DOCUMENTS

| | | | | |
|---|---|---|---|---|
| 3,715,572 A * | 2/1973 | Bennett | .................... | 701/300 |
| 5,058,023 A * | 10/1991 | Kozikaro | ................... | 701/494 |
| 5,117,934 A * | 6/1992 | Tsuyama et al. | ............ | 180/197 |
| 5,220,509 A * | 6/1993 | Takemura et al. | ........... | 701/472 |
| 5,307,277 A * | 4/1994 | Hirano | ................... | 701/207 |
| 5,323,152 A * | 6/1994 | Morita | .................... | 340/988 |
| 5,334,986 A * | 8/1994 | Fernhout | ................ | 342/357.14 |
| 5,416,712 A * | 5/1995 | Geier et al. | .................. | 701/216 |
| 5,670,872 A * | 9/1997 | Van De Walle et al. | ...... | 324/171 |
| 5,719,565 A * | 2/1998 | Tsuno et al. | ................. | 340/905 |
| 5,828,987 A * | 10/1998 | Tano et al. | ................... | 702/150 |
| 5,862,511 A * | 1/1999 | Croyle et al. | ................ | 701/213 |
| 6,266,602 B1 * | 7/2001 | Yamaura | ....................... | 701/80 |
| 6,292,719 B1 * | 9/2001 | Seto et al. | ........................ | 701/1 |
| 6,385,525 B2 * | 5/2002 | Watanabe et al. | .............. | 701/80 |
| 6,466,887 B1 * | 10/2002 | Weinbrenner | ................ | 702/141 |
| 6,477,465 B1 * | 11/2002 | McCall et al. | ................ | 701/220 |

(Continued)

FOREIGN PATENT DOCUMENTS

JP      2001163202 A  *  6/2001 ............... B60T 8/00
WO    WO 93/09509        5/1993 .................... 701/216

*Primary Examiner* — Jack W Keith
*Assistant Examiner* — Chuong P Nguyen
(74) *Attorney, Agent, or Firm* — Leydig, Voit & Mayer, Ltd.

(57) ABSTRACT

A method of determining location of a vehicle includes receiving a wheel speed measurement and receiving a rough road parameter. A rough road weighting factor is determined based on the rough road parameter, and vehicle location is determined based on the determined rough road weighting factor and the wheel speed.

20 Claims, 5 Drawing Sheets

(56) References Cited

U.S. PATENT DOCUMENTS

| | | | |
|---|---|---|---|
| 6,574,550 B2 * | 6/2003 | Hashida | 701/207 |
| 6,577,943 B2 * | 6/2003 | Nakao et al. | 701/80 |
| 6,640,189 B2 * | 10/2003 | Perlmutter et al. | 701/214 |
| 6,643,587 B2 | 11/2003 | Brodie | |
| 6,856,903 B2 * | 2/2005 | Ishigami et al. | 701/213 |
| 2002/0158796 A1 * | 10/2002 | Humphrey et al. | 342/357.14 |
| 2003/0163255 A1 * | 8/2003 | Ishigami et al. | 701/213 |
| 2004/0098187 A1 * | 5/2004 | Nakao | 701/80 |
| 2005/0049774 A1 * | 3/2005 | Kogure | 701/80 |
| 2005/0049787 A1 * | 3/2005 | Cho | 701/216 |
| 2005/0113992 A1 * | 5/2005 | Kitano | 701/29 |
| 2005/0125141 A1 * | 6/2005 | Bye | 701/200 |
| 2005/0143889 A1 * | 6/2005 | Isaji et al. | 701/70 |

* cited by examiner

| | 512 | 502 | 504 | 506 | 510 |
|---|---|---|---|---|---|
| | T0 | a.aaaa | b.bbbb | c.cccc | d.dddd |
| | T1 | a.aaaa | b.bbbb | c.cccc | d.dddd |
| | T2 | a.aaaa | b.bbbb | c.cccc | d.dddd |
| | T3 | a.aaaa | b.bbbb | c.cccc | d.dddd |

METHOD FOR DETERMINING VEHICLE LOCATION INCLUDING ROAD SURFACE DATA

FIELD OF THE INVENTION

This invention relates generally to methods of locating vehicles. In particular, the invention relates to locating vehicles using sensors.

BACKGROUND OF THE INVENTION

GPS devices and other sensors, provide an opportunity to monitor the location of vehicles. Other sensors that provide location information include wheel speed sensors, odometers, magnetometers, gyroscopes, turn rate sensors, and the like. However, sensor information is subject to degradation or conflict with other sensors. For example, buildings or other natural features can interfere with GPS signals.

Dead reckoning navigational assistance is defined herein as navigation without current benefit of GPS information. Thus, although a dead reckoning navigational calculation may begin with GPS information, a dead reckoning navigational calculation is not determined in response to a GPS signal. Dead reckoning systems are known in the art, and often utilize information such as wheel speed, direction, and other factors.

However, on rough roads, wheel speed information may become unreliable as wheel speeds vary. Similar problems result from travel on icy, gravel, brick, or dirt roads.

It is therefore desirable to provide a method for locating vehicles that overcomes the limitations, challenges, and obstacles described above.

SUMMARY OF THE INVENTION

One aspect of the present invention provides a method for locating a vehicle. The method includes receiving a wheel speed measurement and receiving a rough road parameter. A rough road weighting factor is determined based on the rough road parameter; and a vehicle location is determined based on the determined rough road weighting factor and the wheel speed.

Another aspect of the present invention provides a computer readable medium storing a computer program for locating a vehicle. The medium includes computer readable code for receiving a wheel speed measurement and computer program for receiving a rough road parameter. The medium further includes a computer program for determining a rough road weighting factor based on the rough road parameter; and a computer program for determining vehicle location based on the determined rough road weighting factor and the wheel speed.

A third aspect of the present invention provides a system for locating a vehicle. The system includes means for receiving a wheel speed measurement and means for receiving a rough road parameter. The system further includes means for determining a rough road weighting factor based on the rough road parameter; and means for determining vehicle location based on the determined rough road weighting factor and the wheel speed.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
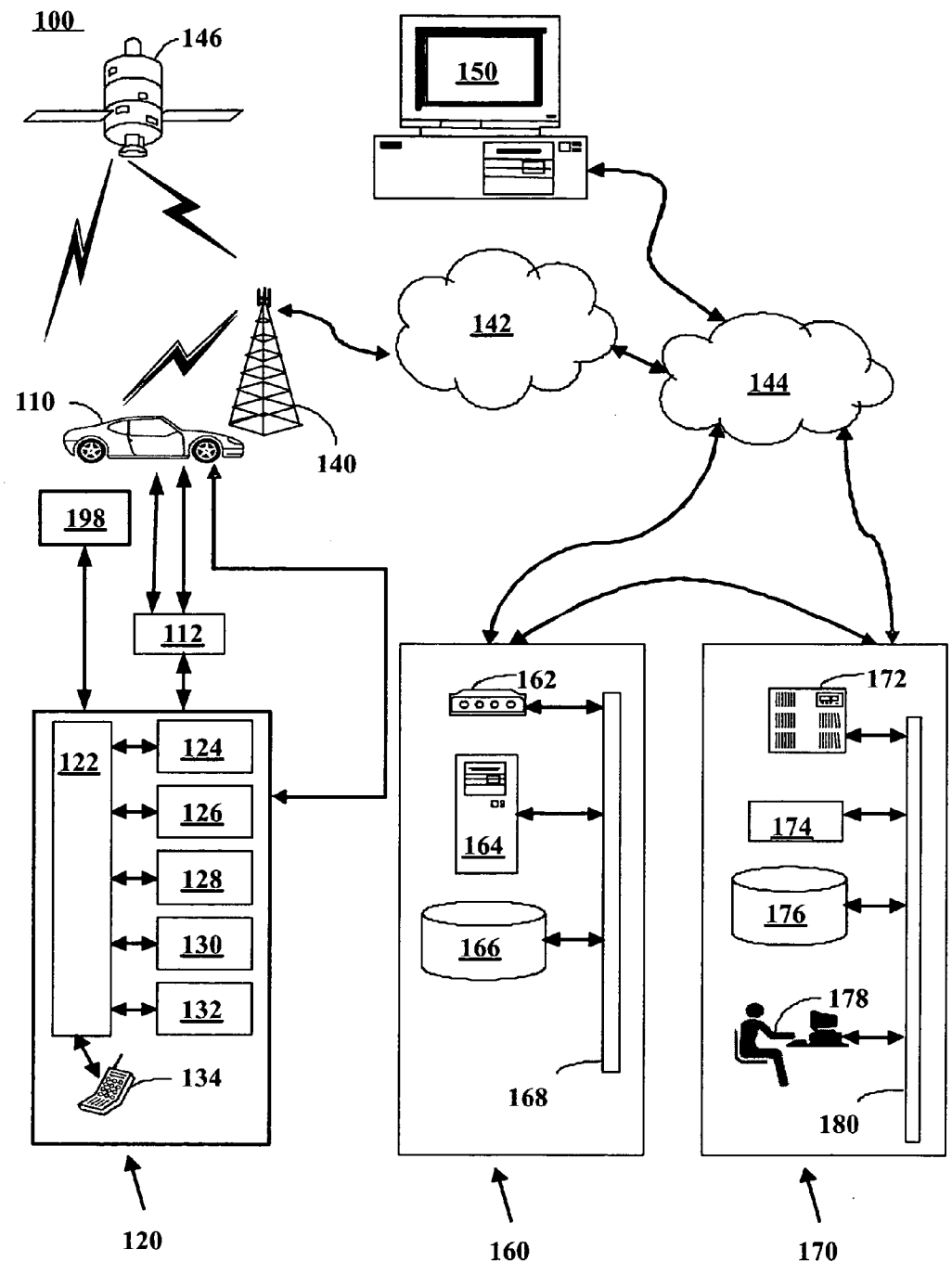
FIG. 1 is a diagram of one embodiment of a system for locating vehicles in accordance with the present invention.

FIG. 1 illustrates an operating environment for a mobile vehicle communication system ("MVCS") 100 for navigation. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112 sends signals to various units of equipment and systems (detailed below) within MVCU 110 to perform various functions such as unlocking a door, opening the trunk, setting personal comfort settings, and calling from telematics unit 120. These functions are performed by sending electronic instructions to a vehicle module configured to perform a certain task or function. In facilitating interactions among the various communication and electronic modules, vehicle communication network 112 utilizes network interfaces such as controller-area network, International Organization for Standardization ("ISO") Standard 9141, ISO Standard 11898 for high speed applications, ISO Standard 11519 for lower speed applications, and Society of Automotive Engineers Standard J1850 for high speed and lower speed applications.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. For example, communications services manager 174 may include at least one digital and/or analog modem.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Wheel speed sensor 198 is configured to determine wheel speed. In one embodiment, wheel speed sensor 198 is an active unit, while in other embodiments, wheel speed sensor 198 is a passive unit. In one embodiment, wheel speed sensor 198 operates utilizing variable reluctance principles. In another embodiment, wheel speed sensor 198 operates using a Hall effect transducer. Wheel speed sensor 198 sends signals indicative of a wheel speed to the vehicle network 112, and vehicle network 112 passes the wheel speed information to, for example, processor 122.

Figure 2:
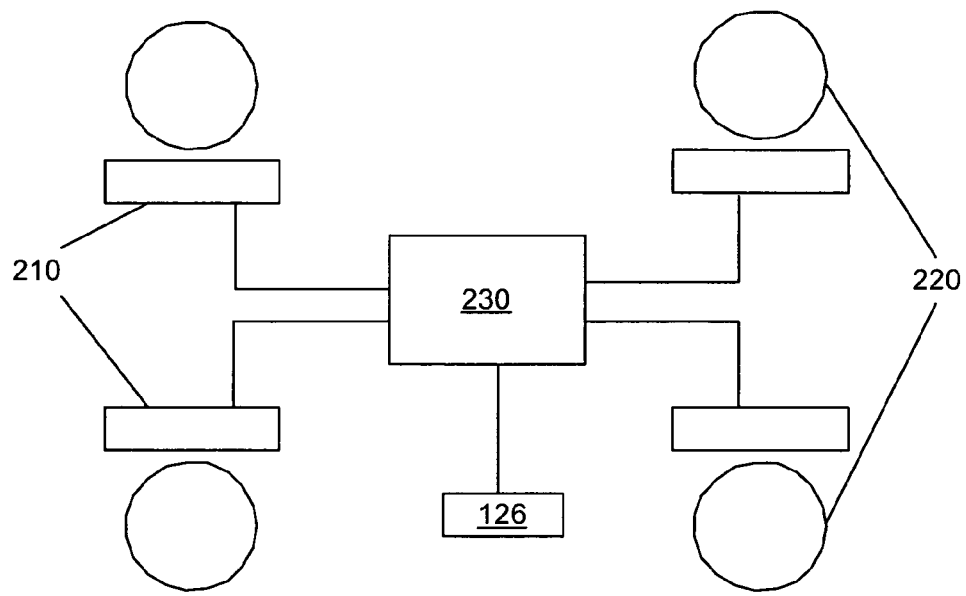
FIG. 2 is a schematic diagram of a wheel speed sensor system.

FIG. 2 illustrates a schematic diagram of a wheel speed sensor system 200, in accordance with one aspect of the invention. System 200 includes four wheel speed sensors 210, four wheels 220, and a controller 230. Those of ordinary skill in the art will readily recognize that a system utilizing more than four, or less than four, wheels and wheel sensors can be constructed and used within the scope of this invention. Controller 230 is in communication with the wheel speed sensors 210, either with a direct, wired connection or a wireless connection utilizing, for example, a device configured in accord with FCC Part 15. In other embodiments, controller 230 is in communication with the wheel speed sensors over the vehicle communication network 112. Each wheel speed sensor 210 is associated with a wheel 220, and is positioned to be operable to sense the speed of its associated wheel. In one embodiment, wheel speed sensor 210 is implemented as wheel speed sensor 198, described above. Controller 230 is configured to receive wheel speed information, receive a rough road parameter and determine a rough road weighting factor based on the rough road parameter. Controller 230 includes a device configured to calculate, such as a processor. For example, controller 230 may be in communication with processor 122 or a similar device, either directly, or via vehicle communication network 112.

In other embodiments, controller 230 is configured as a portion of a navigational device, or configured to calculate navigational information. In one embodiment, controller 230 receives GPS information, from, for example, GPS unit 126, and determines vehicle location in response to GPS signals. Controller 230 is further configured to provide dead reckoning navigational assistance in order to augment or replace GPS information.

Controller 230 receives inputs from wheel speed sensors 210, as well as inputs from other data sources, such as, for example, gyroscopes, barometers, a steering wheel, wheel direction sensors, compasses, or accelerometers. In response to the received inputs, controller 230 is configured to determine a vehicle location.

In addition to wheel speed measurements, controller 230 is configured to receive a rough road parameter. A rough road parameter, as used herein, is data reflective of the road surface, or the roughness of the road. In one embodiment, rough road parameters are obtained from measurements of at least two wheels to determine if the wheel speeds of each wheel exhibit unexpected differences. In one embodiment, the rough road parameter is determined in response to a difference between wheel speeds of at least two wheels. In another embodiment, rough road parameters are derived from data obtained from shock absorbers, gyroscopes, or accelerometers positioned to detect movement perpendicular to the axis of a wheel axel. For example, on a road that is covered in gravel, the wheel speed of the right rear wheel may differ unexpectedly from the wheel speed of the left rear wheel, and this difference may lead to an inference of a rough road. In one embodiment, a rough road parameter is a relatively high number for rough roads, and a relatively low number for smooth roads. In other embodiments, a relatively low rough road parameter is indicative of a rough road.

In response to the received rough road parameter, controller 230 determines a rough road weighting factor. A rough road weighting factor is a factor that reflects the reliability of a wheel speed sensor measurement. When a rough road weighting factor is combined with a wheel speed measurement in a dead reckoning algorithm, the wheel speed measurement is emphasized or de-emphasized. For example, while traveling on a rough road, the rough road weighting factor will operate to de-emphasize wheel speed in the dead reckoning calculations. Thus, in one embodiment, a rough road weighting factor of 0.5 is assigned to a particular rough road parameter, so that the wheel speed measurement, $W_s$, is multiplied by 0.5, (=0.5 $W_s$) for purposes of dead reckoning calculations.

A rough road weighting factor is determined using any appropriate technique. In one embodiment, a rough road weighting factor is set at a default value of 1, and the rough road weighting factor decreases in response to received increasing rough road parameters. A rough road weighting factor can increase as the received rough road parameter decreases. The increase or decrease in rough road weighting factors may be linear, or geometric, such that the impact of wheel speed on dead reckoning calculations can be quickly or slowly modified.

In another embodiment, the rough road parameter is received, with associated GPS location data, from a central location, such as call center 170. In some embodiments, for example, if a particular GPS location is known to feature rough road conditions, a call center 170 communicates those GPS locations, with a rough road parameter to be utilized in navigational calculations. In certain embodiments, results from such utilization of a received rough road parameter are communicated back to the call center 170 so that the call center may optimize the rough road parameter. In one embodiment, the rough road parameter is received at a telematics unit via a wireless network.

Figure 3:
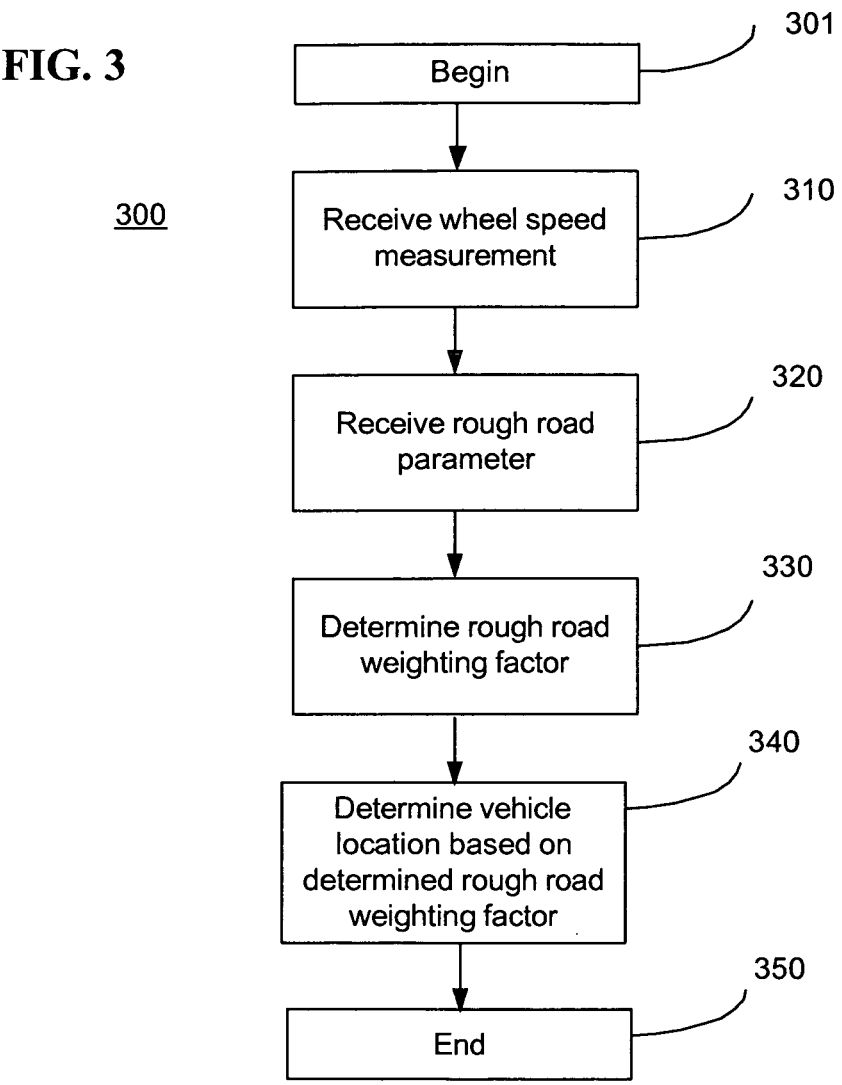
FIG. 3 is a flowchart representative of one embodiment of a method for locating vehicles in accordance with the present invention.

FIG. 3 illustrates one embodiment of a method 300 for determining location of a vehicle, in accordance with one aspect of the invention. Method 300 begins at 301.

A wheel speed measurement is received at step 310, and a rough road parameter is received at step 320. In response to the rough road parameter, a rough road weighting factor is determined at step 330.

A vehicle location is determined based on the rough road weighting factor and wheel speed measurement at step 340. Determining vehicle location, in one embodiment, includes inputting the rough road weighting factor and wheel speed into a navigation filter. For example, a Kalman filter is a navigation filter. In other embodiments, a rolling average filter is used. Method 300 ends at step 350.

Figure 4A:
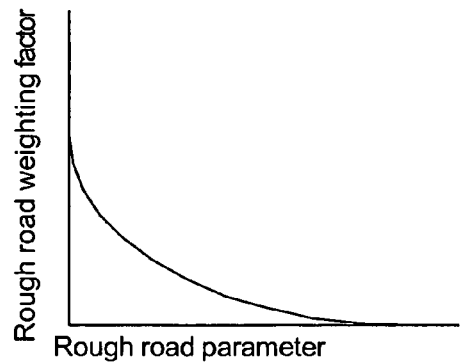
FIGS. 4A, 4B, 4C, and 4D are graphs illustrating exemplary relationships between a rough road parameter and a rough road weighting factor, in accordance with one aspect of the present invention.
Figure 4B:
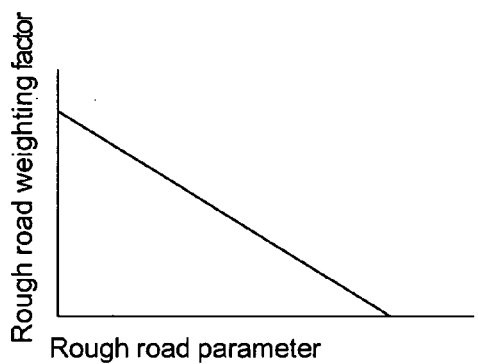
Figure 4C:
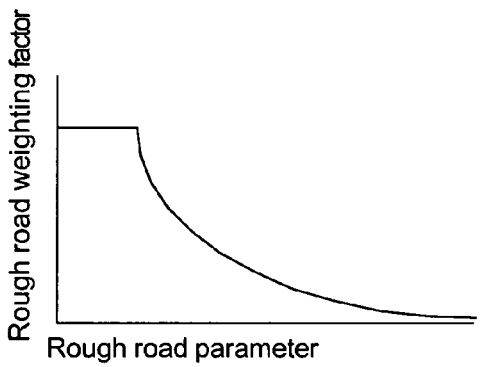
Figure 4D:
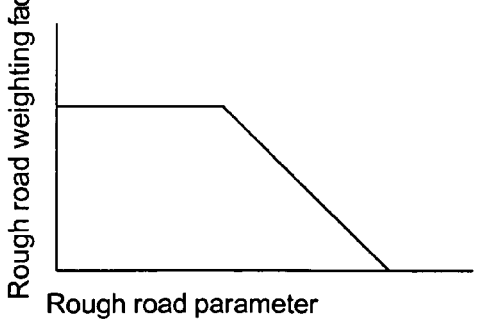

FIGS. 4A, 4B, 4C, and 4D illustrate examples of a relationship between the rough road parameter and the rough road weighting factor. FIG. 4A illustrates a geometric relationship between the rough road parameter and rough road weighting factor, such that the rough road weighting factor affects navigational factors at all levels of rough road parameters, and FIG. 4B illustrates a linear relationship. Conversely, FIGS. 4C and 4D illustrate that the affect of the rough road parameter can, in other embodiments, begin affecting navigational calculations only once the rough road parameter has a predetermined level. FIG. 4C illustrates a geometric relationship, while FIG. 4D illustrates a linear relationship. Those of ordinary skill in the art will readily recognize that the relationship between rough road parameters and rough road weighting factors can be modified or tuned based on the application, and that the starting point for the navigational calculations can likewise be modified in response to a particular application.

For example, FIG. 4A represents a rough road weighting factor that is initialized to one. As the road becomes more difficult to traverse, as indicated by the wheel speed sensors, gyroscopes, accelerometer and/or other sensor readings, the rough road weighting factor decreases and has less influence on the overall navigation position determination.

In one embodiment, the rough road weighting factor is continuously monitored and compared to GPS signals, when GPS signals are available. Results from the comparison are analyzed by a filter in an effort to train the rough road weighting factor such that the rough road weighting factor may be dynamically modified to track performance for a particular vehicle. In one embodiment, the results are sent to a central location, such as call center 170, to track particular geographic locations that result in use of a rough road weighting factor. In another embodiment, the reports of road weighting factor use are reported to a central location with the model and year of the vehicle being driven, such that the central location may determine how well various vehicles perform on rough roads. Communication with the call center may be triggered automatically upon de-emphasizing wheel speed in positional calculations, or the results may be transmitted to the central location during a communication for another purpose.

In another example, when the rough road parameter is utilized in navigation calculations, a tire pressure reading or estimation is taken. Tire pressure is tracked, and filtered to dynamically determine the rough road weighting factor in response to tire pressure. Such tracking is, in one embodiment, reported to the central location for analysis over a plurality of vehicles.

Figures 5A, 5B:
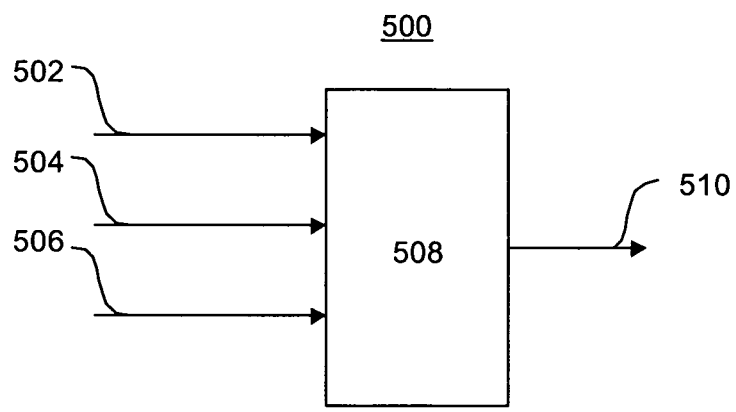
FIGS. 5A and 5B are schematic illustrations of one embodiment of a navigational filter, in accordance with another aspect of the invention.

FIG. 5A is a schematic illustration of one embodiment of a system 500 for determining vehicle location. System 500 includes navigation filter 508, inputs 502 through 506 and output 510. Input 502 is the rough road weighting factor, 504 is an accelerometer input, and 506 is a gyroscope input. In this example, block 508 contains a table holding the input values and reserves space for the result of a rolling average algorithm. Output 510 is the filtered results of a navigational filter, such as a Kalman filter or a rolling average filter. In one embodiment, output 510 is configured for further operations by a navigational device.

FIG. 5B illustrates one embodiment of the table contained within block 508. Column 512 represents the time quanta when the inputs values are read. 502 is the rough road weighting factor expressed as a real number a.aaaa, 504 is the accelerometer input expressed as a real number b.bbbb, and 506 is the gyroscope input expressed as a real number c.cccc. These numbers are summed and averaged, with the results d.dddd placed in an output register 510. The output 510 is made available for further processing.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of determining a location of a vehicle using dead reckoning navigation based upon wheel speed sensor measurement, wherein the vehicle includes a controller, a vehicle communication network, a wheel speed sensor, and a telematics unit configured to communicate via a wireless carrier system, and wherein the determining the location using dead reckoning navigation is based upon a combination of locally generated vehicle sensor measurements and rough road parameter information received by the vehicle from a server, associated with a remote central rough road data repository, via the wireless carrier system, the method comprising:
  receiving, by the controller, a wheel speed measurement provided by the wheel speed sensor via the vehicle communication network;
  receiving, by the controller, a rough road parameter, wherein the rough road parameter is a geospatial location-specific value from the central rough road data repository provided to the vehicle via the wireless carrier system;
  determining, by the controller based upon the rough road parameter, a rough road weighting factor indicative of a level of reliability of the wheel speed measurement; and
  determining, by the controller using dead reckoning navigation, the location of the vehicle based on the wheel speed measurement and the rough road weighting factor.

2. The method of claim 1 wherein the wheel speed measurement is calculated via a filter.

3. The method of claim 1 wherein the rough road parameter is determined in response to a difference between wheel speeds of at least two wheels of the vehicle.

4. The method of claim 1 wherein the rough road weighting factor varies linearly with respect to the rough road parameter.

5. The method of claim 1 wherein the rough road weighting factor varies geometrically with respect to the rough road parameter.

6. The method of claim 1 wherein determining the location of the vehicle using dead reckoning navigation, based on the wheel speed measurement comprises:
  inputting a gyroscope input and an accelerometer input into a navigational filter.

7. The method of claim 1 further comprising:
  comparing for a current location of the vehicle, by the controller:
    the location of the vehicle using dead reckoning navigation, and
    a wireless geospatial navigation system-rendered location; and
  sending, by the controller, to the central rough road data repository via the wireless carrier system, a result of the comparing,
  wherein the result is provided with a model and a year of the vehicle.

8. A non-transitory computer readable medium having stored thereon computer executable instructions for determining a location of a vehicle using dead reckoning navigation based upon wheel speed sensor measurement, wherein the vehicle includes a controller, a vehicle communication network, a wheel speed sensor, and a telematics unit configured to communicate via a wireless carrier system, and wherein the determining the location using dead reckoning navigation is based upon a combination of locally generated vehicle sensor measurements and rough road parameter information received by the vehicle from a server, associated with a remote central rough road data repository, via the wireless carrier system, the instructions comprising instructions for:
  receiving, by the controller, a wheel speed measurement provided by the wheel speed sensor via the vehicle communication network;
  receiving, by the controller, a rough road parameter, wherein the rough road parameter is a geospatial location-specific value from the central rough road data repository provided to the vehicle via the wireless carrier system;
  determining, by the controller based on the rough road parameter, a rough road weighting factor indicative of a level of reliability of the wheel speed measurement; and
  determining, by the controller using dead reckoning navigation, the location of the vehicle based on the rough road weighting factor and the wheel speed measurement.

9. The medium of claim 8 wherein the instructions for determining a vehicle location comprise instructions for inputting the rough road weighting factor and the wheel speed measurement into a filter.

10. The medium of claim 8 wherein the rough road weighting factor is a number between zero and 1.

11. The medium of claim 8 wherein the rough road parameter is determined in response to a difference between wheel speeds of at least two wheels.

12. The medium of claim 8 wherein the rough road weighting factor varies linearly with respect to the rough road parameter.

13. The medium of claim 8 wherein the rough road weighting factor varies geometrically with respect to the rough road parameter.

14. The medium of claim 8 wherein the instructions for determining, based on the rough road vehicle weighting factor and the wheel speed measurement, a vehicle location comprises:
   instructions for inputting, into a navigational filter, the rough road weighting factor, a gyroscope input, and an accelerometer input.

15. The medium of claim 8 wherein computer readable code for receiving a rough road parameter comprises computer readable code for receiving a rough road parameter from a call center.

16. The medium of claim 8 further comprising computer executable instructions for performing the method including:
   comparing for a current location of the vehicle, by the controller:
      the location of the vehicle using dead reckoning navigation, and
      a wireless geospatial navigation system-rendered location; and
   sending, by the controller, to the central rough road data repository via the wireless carrier system, a result of the comparing,
   wherein the result is provided with a model and a year of the vehicle.

17. A system for determining a location of a vehicle using dead reckoning navigation based upon wheel speed sensor measurement, wherein the vehicle includes a controller, a vehicle communication network, and a telematics unit configured to communicate via a wireless carrier system, and wherein the determining the location using dead reckoning navigation is based upon a combination of locally generated vehicle sensor measurements and rough road parameter information received by the vehicle from a server, associated with a remote central rough road data repository, via the wireless carrier system, the system comprising:
   a wheel speed sensor configured to sense the speed of an associated wheel and provide a corresponding wheel speed measurement; and
   a controller, comprising a processor communicatively connected with the wheel speed sensor via the vehicle communication network and configured to:
   receive, via the vehicle communication network, a wheel speed measurement;
   receiving a rough road parameter, wherein the rough road parameter is a geospatial location-specific value from the central rough road data repository provided to the vehicle via the wireless carrier system;
   determining, by the controller based on the rough road parameter a rough road weighting factor indicative of a level of reliability of the wheel speed measurement; and
   determining, by the controller using dead reckoning navigation, the location of the vehicle based on the rough road weighting factor and the wheel speed measurement.

18. The system of claim 17 wherein determining the vehicle location based on the wheel speed measurement utilizes a filter configured to receive a gyroscope input and an accelerometer input.

19. The system of claim 17 wherein means for receiving a rough road parameter comprises means for receiving a rough road parameter from a call center.

20. The system of claim 17 wherein the controller is further configured to perform the method including:
   comparing for a current location of the vehicle, by the controller:
      the location of the vehicle using dead reckoning navigation, and
      a wireless geospatial navigation system-rendered location; and
   sending, by the controller, to the central rough road data repository via the wireless carrier system, a result of the comparing,
   wherein the result is provided with a model and a year of the vehicle.

* * * * *